(12) United States Patent
Baek et al.

(10) Patent No.: US 9,774,196 B2
(45) Date of Patent: Sep. 26, 2017

(54) BATTERY PACK PROTECTION DEVICE AND METHOD

(71) Applicant: LG CHEM, LTD., Seoul (KR)

(72) Inventors: Seoung Mun Baek, Daejeon (KR); Young Bo Cho, Daejeon (KR); Gyongjin Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 137 days.

(21) Appl. No.: 14/428,179

(22) PCT Filed: May 12, 2014

(86) PCT No.: PCT/KR2014/004212
§ 371 (c)(1),
(2) Date: Mar. 13, 2015

(87) PCT Pub. No.: WO2015/002379
PCT Pub. Date: Jan. 8, 2015

(65) Prior Publication Data
US 2015/0256006 A1    Sep. 10, 2015

(30) Foreign Application Priority Data

Jul. 2, 2013    (KR) .................. 10-2013-0077181

(51) Int. Cl.
*H02J 7/00*    (2006.01)
*H02J 7/04*    (2006.01)

(52) U.S. Cl.
CPC .......... *H02J 7/0026* (2013.01); *H02J 7/0021* (2013.01); *H02J 7/0031* (2013.01); *H02J 7/04* (2013.01);
(Continued)

(58) Field of Classification Search
CPC .................................................. H02J 7/0031
(Continued)

(56) References Cited

U.S. PATENT DOCUMENTS 5,789,900 A      8/1998  Hasegawa et al.
6,492,791 B1 *  12/2002  Saeki .................. H01M 10/425
                                                         320/118
(Continued)

FOREIGN PATENT DOCUMENTS

JP    10-174298 A    6/1998
JP    11-215716 A    8/1999
(Continued)

OTHER PUBLICATIONS

Korean Office Action for Appl. No. 10-2013-0077181 dated Oct. 20, 2015 (w/ English translation).
(Continued)

*Primary Examiner* — Yalkew Fantu
(74) *Attorney, Agent, or Firm* — Birch, Stewart, Kolasch & Birch, LLP (57) ABSTRACT

Disclosed are a battery pack protection device and method. The battery pack protection device includes: a sensing unit configured to sense an overcharging state or an overdischarging state of a battery; a plurality of switches installed on a charging path and a discharging path of the battery; a control unit configured to control the plurality of switches so that the battery is both chargeable and dischargeable when the battery is not in the overcharging state or the overdischarging state and control the plurality of switches so that the battery is only dischargeable during overcharging or only chargeable during overdischarging by an output signal of the sensing unit; and a display unit configured to display the charging state or the discharging state of the battery.

13 Claims, 5 Drawing Sheets (52) U.S. Cl.
CPC . *H02J 2007/004* (2013.01); *H02J 2007/0037* (2013.01)

(58) Field of Classification Search
USPC .......................................... 320/136
See application file for complete search history.

(56) References Cited

U.S. PATENT DOCUMENTS

| | | | | |
|---|---|---|---|---|
| 6,812,673 B2* | 11/2004 | Fujiwara | ............... | H02J 7/0031 320/136 |
| 6,885,168 B2* | 4/2005 | Okumura | ............ | H01M 10/425 320/135 |
| 7,436,151 B2* | 10/2008 | Wang | ................... | H02J 7/0031 320/134 |
| 7,595,619 B2* | 9/2009 | Vieira Formenti | ....... | H02J 7/04 323/282 |
| 8,314,589 B2* | 11/2012 | Hur | ...................... | H02J 7/0031 320/104 |
| 2006/0076930 A1* | 4/2006 | Ooshita | ................ | H01M 10/42 320/134 |
| 2006/0208850 A1 | 9/2006 | Ikeuchi et al. | | |
| 2006/0255768 A1* | 11/2006 | Yoshio | .................. | H02J 7/0029 320/134 |
| 2009/0295335 A1 | 12/2009 | Yang et al. | | |

FOREIGN PATENT DOCUMENTS

| | | | |
|---|---|---|---|
| JP | 2006-254650 A | | 9/2006 |
| JP | 2009-089468 A | | 4/2009 |
| JP | 2009-089768 | * | 4/2009 |
| JP | 2013-048497 A | | 3/2013 |
| KR | 10-2009-0126098 A | | 12/2009 |

OTHER PUBLICATIONS

International Search Report issued in PCT/KR2014/004212, dated Aug. 25, 2014.
Written Opinion issued in PCT/KR2014/004212, dated Aug. 25, 2014.
Extended European Search Report for Appl. No. 14820400.1 dated May 11, 2016.
Korea Office Action dated Apr. 16, 2015 for Appl. No. 10-2013-0077181 (w/ English translation).

* cited by examiner

BATTERY PACK PROTECTION DEVICE AND METHOD

TECHNICAL FIELD

This application claims priority to and the benefit of Korean Patent Application No. 10-2013-0077181 filed in the Korean Intellectual Property Office on Jul. 2, 2013, the entire contents of which are incorporated herein by reference.

The present invention relates to a battery pack protection device and method, and more particularly, to a battery pack protection device and method that can extend a battery lifespan by performing conversion for charging and discharging of the battery smoothly so as to be suitable for a current state and control properly a timing of charging and discharging by allowing a user to easily check a current charging and discharging state of the battery, by sensing an overcharging state or an overdischarging state of the battery and controlling a plurality of switches installed on a charging path and a discharging path of the battery.

BACKGROUND ART

Recently, with rapid development of industry and economy, as the spread of electric devices and electronic devices is rapidly increased, demands for stable power supply and high-quality power have been increased, and as a result, a use of a uninterruptible power supply (UPS) for stable power supply during a power failure has rapidly increased. The degradation of power quality due to a momentary power failure, voltage sag, and a harmonic wave causes huge economic losses to the industry. As a part for solving such a problem of power quality, in the UPS frequently used in the industry, most of reliability for a stable operation is secured with rapid development of a power electronic technology, but the degradation of the power quality during the power failure due to a defect of a battery for energy storage has often occurred.

Accordingly, the importance of a technology of a battery management system (BMS) for more effectively using and managing the battery has been increased. Particularly, the BMS needs to prevent overcharging and overdischarging and protect the battery by easily controlling a charging state or a discharging state of the battery.

Generally, since the battery has a very high energy density, in the case where the battery is overcharged at a predetermined voltage or more, if the overcharging is severe, a structure of a positive active material is broken or oxidation of electrolytes is accompanied, and if this case persists, the voltage is increased and the battery is exploded or ignited. Further, a lifespan is shortened, the risk of accidents exists due to an instable characteristic of the battery, and as a result, the deterioration of the entire reliability of the UPS is caused.

Figure 1:
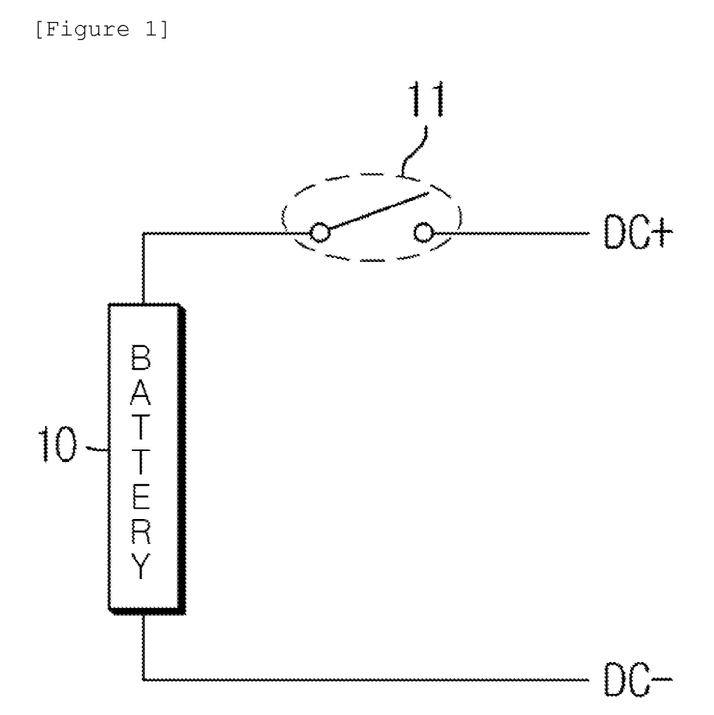
FIG. 1 is a circuit diagram for describing a device for charging and discharging a battery in the related art.

Referring to FIG. 1, a battery charging and discharging circuit in the related art is illustrated, and may control charging and discharging by using only one switch 11 connected with the battery in series on a charging and discharging path. As a result, the battery charging and discharging circuit in the related art blocks a charging current by opening the switch 11 when the overcharging occurs, thereby preventing overcharging. However, the discharging current cannot move due to the opening of the switch 11.

Further, the battery charging and discharging circuit in the related art blocks the discharging current by opening the switch 11 when the discharging occurs, thereby preventing the overdischarging. However, the charging current cannot also flow due to the opening of the switch 11.

Finally, in the existing method, there are problems in that the discharging may be required even during the overcharging and the charging may be required even during the overdischarging, and both the charging and the discharging are not performed.

DETAILED DESCRIPTION OF THE INVENTION

Technical Problem

In order to solve the aforementioned problems in the related art, an object of the present invention is to provide a battery pack protection device and method, and more particularly, a battery pack protection device and method that can extend a battery lifespan by performing conversion for charging and discharging of the battery smoothly so as to be suitable for a current state and control properly a timing of charging and discharging by allowing a user to easily check a current charging and discharging state of the battery, by sensing an overcharging state or an overdischarging state of the battery and controlling a plurality of switches installed on a charging path and a discharging path of the battery.

Technical Solution

An exemplary embodiment of the present invention provides a battery pack protection device including: a sensing unit configured to sense an overcharging state or an overdischarging state of a battery; a plurality of switches installed on a charging path and a discharging path of the battery; and a control unit configured to control the plurality of switches so that the battery are both chargeable and dischargeable when the battery is not in the overcharging state or the overdischarging state and control the plurality of switches so that the battery is only dischargeable during overcharging or only chargeable during overdischarging by an output signal of the sensing unit.

The battery pack protection device may further include a plurality of unidirectional elements on the charging path and the discharging path of the battery.

The unidirectional elements may be diodes.

The plurality of switches may include a first switch installed on the charging path and a second switch installed on the discharging path.

The control unit may control the battery to be only dischargeable by opening the first switch and closing the second switch when the sensing unit senses the overcharging state.

The control unit may control the battery to be only chargeable by closing the first switch and opening the second switch when the sensing unit senses the overdischarging state.

The battery pack protection device may further include a display unit configured to display the charging state or the discharging state of the battery.

The display unit may display the overcharging state when the sensing unit senses the overcharging state and display the overdischarging state when the sensing unit senses the overdischarging state.

Another exemplary embodiment of the present invention provides a battery pack protection method including: sensing overcharging or overdischarging of a battery; controlling a plurality of switches so that the battery is both chargeable and dischargeable when the battery is not in an overcharging state or an overdischarging state; and controlling the plurality of switches so that the battery is only dischargeable during the overcharging or only chargeable during the overdischarging by an output signal of the sensing unit.

In the controlling of the plurality of switches so that the battery is only dischargeable during the overcharging or only chargeable during the overdischarging by the output signal of the sensing unit, when the overcharging state of the battery is sensed in the sensing, the switches may be controlled so that the battery is only dischargeable by opening the first switch and closing the second switch.

In the controlling of the plurality of switches so that the battery is only dischargeable during the overcharging or the battery is only chargeable during the overdischarging by the output signal of the sensing unit, when the overdischarging state of the battery is sensed in the sensing, the switches may be controlled so that the battery is only chargeable by closing the first switch and opening the second switch.

The battery pack protection method may further include displaying the charging state or the discharging state of the battery.

In the displaying, the overcharging state may be displayed when the overcharging state is sensed in the sensing, and the overdischarging state may be displayed when the overdischarging state is sensed in the sensing.

Advantageous Effects

According to the embodiments of the present invention, it is possible to provide a battery pack protection device and method, and more particularly, a battery pack protection device and method that can extend a battery lifespan by performing conversion for charging and discharging of the battery smoothly so as to be suitable for a current state and control properly a timing of charging and discharging by allowing a user to easily check a current charging and discharging state of the battery, by sensing an overcharging state or an overdischarging state of the battery and controlling a plurality of switches installed on a charging path and a discharging path of the battery.

BEST MODE

The present invention will be described below in detail with reference to the accompanying drawings. Here, the repetitive description and the detailed description of known functions and configurations which can unnecessarily obscure the gist of the present invention will be omitted. Embodiments of the present invention are provided in order to more completely describe the present invention to those skilled in the art. Accordingly, in the drawings, shapes, sizes, etc., of the elements are exaggerated for more clear explanation.

Throughout this specification, unless explicitly described to the contrary, the word "comprise" and variations such as "comprises" or "comprising", will be understood to imply the inclusion of stated elements but not the exclusion of any other elements.

Further, a term of "unit" disclosed in the specification means a unit for processing one or more functions or operations, and may be implemented with hardware or software, or in combination of the hardware and the software.

Hereinafter, an electric vehicle means a vehicle including one or more electric motors as driving force. Energy used to drive the electric vehicle includes an electrical source such as a rechargeable battery and/or fuel cell. The electric vehicle may be a hybrid electric vehicle using an internal combustion engine as another power source.

Figure 2:
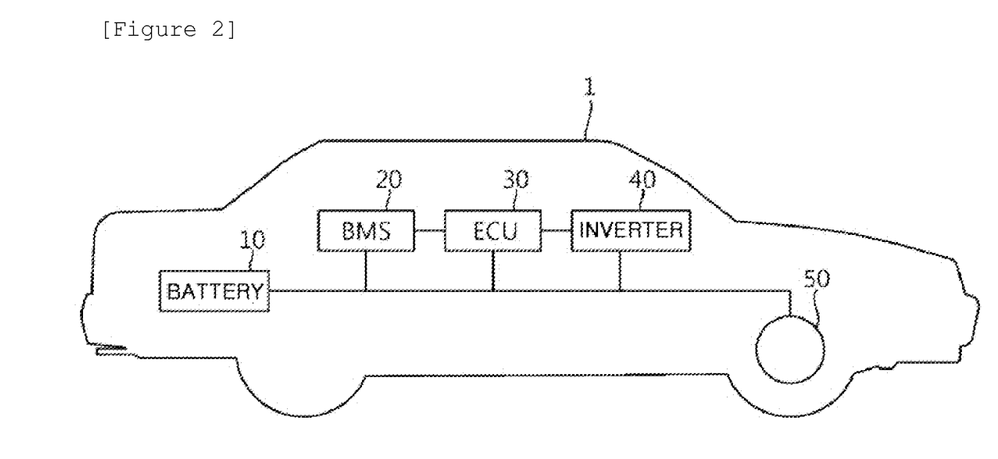
FIG. 2 is a diagram schematically illustrating an electric vehicle to which a battery pack protection device may be applied according to an exemplary embodiment of the present invention.

FIG. 2 is a diagram schematically illustrating an electric vehicle to which a battery pack protection device 100 may be applied according to an exemplary embodiment of the present invention.

In FIG. 2, the battery pack protection device 100 according to the exemplary embodiment of the present invention is applied to the electric vehicle, but the battery pack protection device according to the exemplary embodiment of the present invention may be applied to any technical field to which a secondary battery may be applied, such as an energy storage system (ESS) for household or industry or a uninterruptible power supply (UPS) system in addition to the electric vehicle.

An electric vehicle 1 may include a battery 10, a battery management system (BMS) 20, an electronic control unit (ECU) 30, an inverter 40, and a motor 50.

The battery 10 is an electric energy source which drives the electric vehicle 1 by supplying driving force to the motor 50. The battery 10 may be charged or discharged by the inverter 40 according to driving of the motor 50 and/or an internal combustion engine (not illustrated).

Here, a kind of battery 10 is not particularly limited, and for example, the battery 10 may be configured by a lithium-ion battery, a lithium polymer battery, a nickel cadmium battery, a nickel hydrogen battery, a nickel zinc battery, and the like.

Further, the battery 10 is formed as a battery pack in which a plurality of battery cells are connected with each other in series and/or in parallel. In addition, one or more battery packs are provided to form the battery 10.

The BMS 20 estimates a state of the battery 10 and manages the battery 10 by using estimated state information. For example, the BMS 20 estimates and manages the state information of the battery 10, such as a state of charging (SOC), a state of health (SOH), a maximum input/output power allowance, and an output voltage of the battery 10. In addition, the BMS 20 controls charging or discharging of the battery 10 by using the state information, and furthermore, may estimate a replacement time of the battery 10.

Further, the BMS 20 may include the battery pack protection device 100 according to the exemplary embodiment of the present invention to be described below. By such a battery pack protection device 100, the charging and discharging of the battery 10 may be properly controlled, and the battery 10 may be protected during overcharging or overdischarging.

The ECU 30 is an electronic control device controlling the state of the electric vehicle 1. For example, the ECU 30 determines a torque degree based on information such as an accelerator, a break, and a speed, and controls an output of the motor 50 to be suitable for the torque information.

Further, the ECU 30 transmits a control signal to the inverter 40 so that the battery 10 may be charged or discharged based on the state information such as the SOC and the SOH of the battery 10 which are received by the BMS 20.

The inverter 40 allows the battery 10 to be charged or discharged based on the control signal of the ECU 30.

The motor 50 drives the electric vehicle 1 based on the control information (for example, torque information) transferred from the ECU 30 by using the electric energy of the battery 10.

Since the aforementioned electric vehicle 1 is driven by using the electric energy of the battery 10, it is important to exactly estimate the state of the battery 10, for example, the charging state, the discharging state, the overcharging state, and the overdischarging state.

Figure 3:
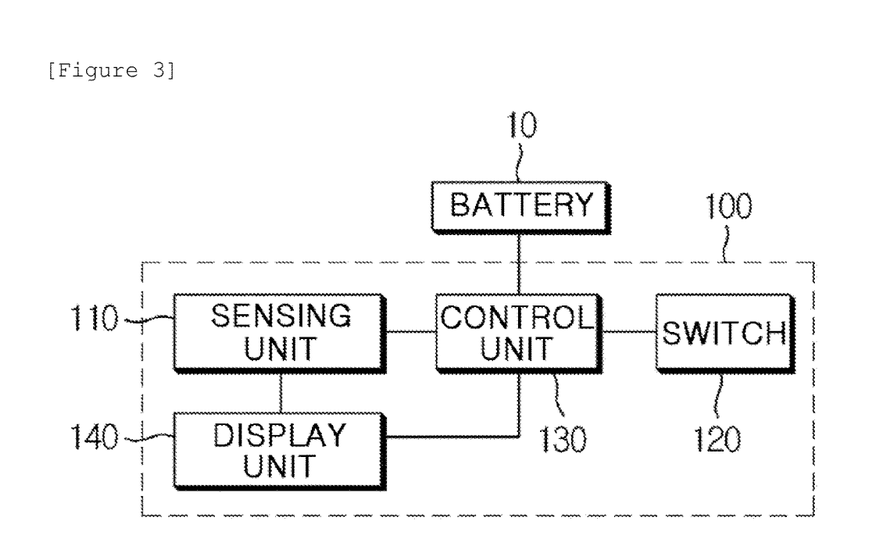
FIG. 3 is a block diagram schematically illustrating a configuration of the battery pack protection device according to the exemplary embodiment of the present invention.

FIG. 3 is a diagram illustrating a configuration of the battery pack protection device according to the exemplary embodiment of the present invention.

Referring to FIG. 3, the battery pack protection device 100 according to the exemplary embodiment of the present invention may include a sensing unit 110, a switch 120, a control unit 130, and a display unit 140. The battery pack protection device 100 illustrated in FIG. 3 is in accordance with the exemplary embodiment, constituent elements thereof are limited to the embodiment illustrated in FIG. 3, and some constituent elements may be added, modified, or deleted if necessary.

The sensing unit 110 senses the overcharging state or the overdischarging state of the battery 10. In the embodiment, the sensing unit 110 may sense the overcharging state or the overdischarging state only in the case where the charging amount or the discharging amount is more or less than a predetermined reference value. For example, when the charging amount flowing into the battery 10 is 100% or more, the state may be determined as overcharging. Further, when the discharging amount flowing into the battery 10 is 90% or more or the charging amount is 10% or less, the state may be determined as overdischarging. The reference value may be a predetermined fixed value as an initial value in the sensing unit 110, and may be a value changed by receiving the input of the user.

The switch 120 is a plurality of switches installed on the charging path and the discharging path of the battery 10. For example, the switch 120 may include one or more of a limit switch, a relay switch, a proximity switch, a micro switch, and a photoelectric switch.

The control unit 130 may control the switch 120 so that the battery 10 is both chargeable and dischargeable, and control the switch 120 so that the battery is only chargeable or only dischargeable by an output signal of the sensing unit 110. In the embodiment, in the case of sensing the overcharging state in the sensing unit 110, the control unit 130 may control the battery 10 to be only dischargeable by opening the switch positioned on the charging path and closing the switch positioned on the discharging path. Further, in the case of sensing the overdischarging state in the sensing unit 110, the control unit 130 may control the battery 10 to be only chargeable by closing the switch positioned on the charging path and opening the switch positioned on the discharging path.

Hereinafter, a control method of the control unit 130 of the battery pack protection device 100 according to the exemplary embodiment of the present invention will be described in detail with reference to FIG. 4.

Figure 4:
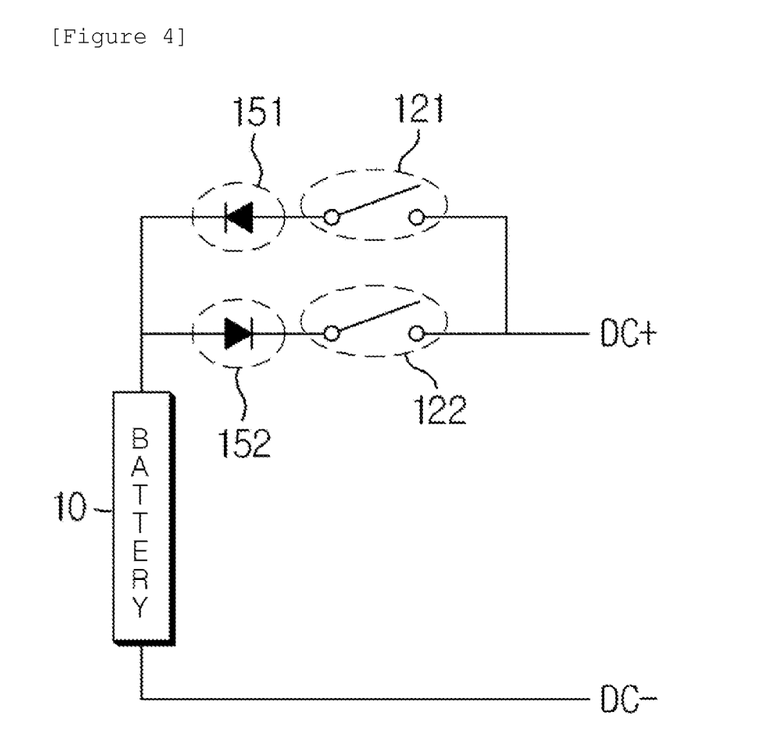
FIG. 4 is a circuit diagram illustrating an example of a detailed configuration of the battery pack protection device according to the exemplary embodiment of the present invention.

FIG. 4 is a circuit diagram illustrating an example of a detailed configuration of the battery pack protection device 100 according to the exemplary embodiment of the present invention. In FIG. 4, the control unit 130 is not illustrated, but actually, the control unit 130 is connected to the switch 120 to control the switch 120. Referring to FIG. 4, in the battery pack protection device 100 according to the exemplary embodiment of the present invention, the switch 120 may include a first switch 121 installed on the charging path and a second switch 122 installed on the discharging path. Further, the battery pack protection device 100 may further include a plurality of unidirectional elements 151 and 152 on the charging path and the discharging path, and for example, the unidirectional elements 151 and 152 may be diodes.

Here, in the case where the battery 10 is not in the overcharging state or the overdischarging state, the control unit 130 closes the first switch 121 installed on the charging path and closes the second switch 122 installed on the discharging path, and as a result, movement of the current is free, and the battery is both chargeable and dischargeable.

Further, in the case of the overcharging state, when the control unit 130 opens the first switch 121 installed on the charging path and closes the second switch 122 installed on the discharging path, the movement of the current to the charging path is limited by the unidirectional element, and the current is induced only to the discharging path.

Further, in the case of the overdischarging state, when the control unit 130 closes the first switch 121 installed on the charging path and opens the second switch 122 installed on the discharging path, the movement of the current to the discharging path is limited by the unidirectional element, and the current is induced only to the charging path.

Referring back to FIG. 3, the display unit 140 may display the charging state or the discharging state of the battery 10. For example, the display unit 140 may include one or more of a liquid crystal display (LCD) device, a light emitting diode (LED) device, a cathode-ray tube (CRT) device, a plasma display panel (PDP) device, and an organic light emitting diode (OLED) device.

Meanwhile, it is cautious that the display unit 140 performing the aforementioned role is not limited to a kind of the described display device.

The display unit 140 may display the overcharging state when the sensing unit 110 senses the overcharging state, and display the overdischarging state when the sensing unit 110 senses the overdischarging state. The display unit 140 may select and display one or more charging and discharging states when the sensing unit 110 senses the state. For example, the display unit 140 may display a voltage amount flowing into the battery 10, a charging amount, a discharging amount, a residual amount, charging and discharging states, or a current amount.

Figure 5:
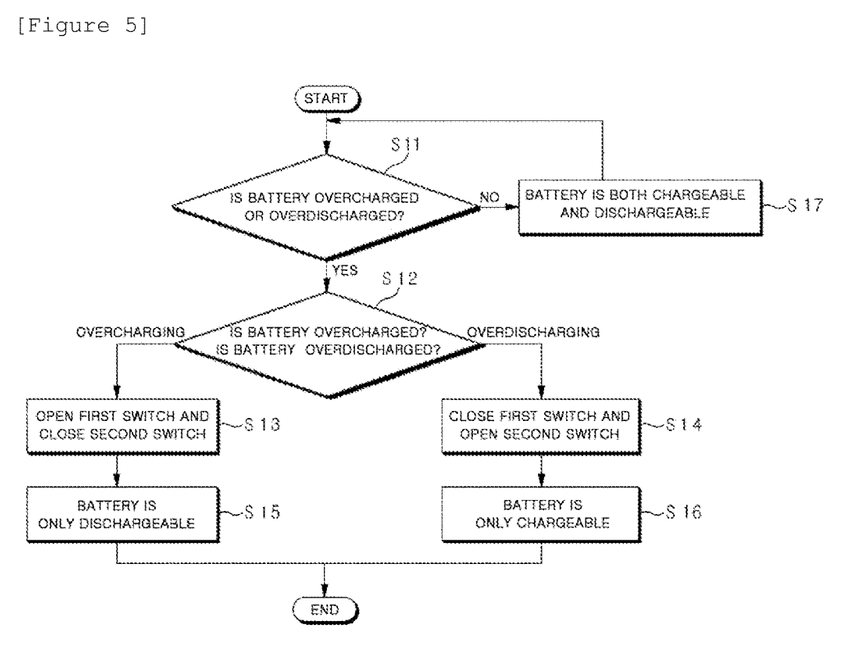
FIG. 5 is a flowchart for describing a battery pack protection method according to another embodiment of the present invention.

FIG. 5 is a flowchart for describing a battery pack protection method according to another embodiment of the present invention.

Referring to FIG. 5, when a battery pack protection method according to another embodiment of the present invention starts, first, whether there is overcharging or overdischarging of the battery is sensed (S11), and whether the battery is in the overcharging state or the overdischarging state is determined (S12). Since the processes of the steps S11 and S12 follow the description for the sensing unit 110, the duplicated description will be omitted.

In addition, in the case where the sensing unit 110 does not sense the overcharging or the overdischarging of the battery, the battery is both chargeable and dischargeable (S17). In this case, while both the switch (121 of FIG. 4) and the switch (122 of FIG. 4) are closed, the battery is freely chargeable and dischargeable.

In addition, in the case where it is determined that the battery is overcharged, the battery is only dischargeable (S15) by opening the first switch (121 of FIG. 4) and closing the second switch (122 of FIG. 4) (S13).

In addition, in the case where it is determined that the battery is overdischarged, the battery is only chargeable (S16) by closing the first switch (121 of FIG. 4) and opening the second switch (122 of FIG. 4) (S14). Since the processes of the steps S13 and S14 follow the description for the control unit 130, the duplicated description will be omitted.

Next, in the case where the battery is not in the overcharging state or the overdischarging state, the processes end.

The aforementioned battery pack protection method is described with reference to the flowchart illustrated in the drawing. For simple description, the method is illustrated and described as a series of blocks, but the present invention is not limited to an order of the blocks, and some blocks may occur in a different order illustrated and described in this specification from or simultaneously with other blocks, and various other branches, flow paths, and orders of the blocks which achieve the same or a similar result may be implemented. Further, all of the blocks illustrated for implementing the method described in this specification may not be required.

While the invention has been shown and described with respect to the specific embodiments, it will be apparent to those skilled in the art that the spirit of the present invention is not limited to the accompanying drawings and the described contents and various changes and modifications may be made without departing from the spirit of the invention as defined in the following claims. The modifications may belong to the claims of the invention without departing from the spirit of the present invention.

The invention claimed is:

1. A battery pack protection device, comprising:
   a sensing unit configured to sense an overcharging state when a charging amount is more than a first predetermined reference value and sense an overdischarging state of a battery when a discharging amount is more than a second predetermined reference value and the charging amount is less than a third predetermined reference value;
   a plurality of switches installed on a charging path and a discharging path of the battery; and
   a control unit configured to control the plurality of switches so that the battery is only dischargeable during overcharging or only chargeable during overdischarging by an output signal of the sensing unit,
   wherein the control unit is further configured to control the plurality of switches so that the battery is both chargeable and dischargeble when the charging amount is less than the first predetermined reference value and more than the third predetermined reference value, and when the discharging amount is more than the second predetermined reference value, during charging or discharging of the battery.

2. The device of claim 1, further comprising:
   a plurality of unidirectional elements on the charging path and the discharging path of the battery.

3. The device of claim 2, wherein the unidirectional elements are diodes.

4. The device of claim 1, wherein the plurality of switches include a first switch installed on the charging path and a second switch installed on the discharging path.

5. The device of claim 4, wherein the control unit controls the battery to be only dischargeable by opening the first switch and closing the second switch when the sensing unit senses the overcharging state.

6. The device of claim 4, wherein the control unit controls the battery to be only chargeable by closing the first switch and opening the second switch when the sensing unit senses the overdischarging state.

7. The device of claim 1, further comprising:
   a display unit configured to display the charging state or the discharging state of the battery.

8. The device of claim 7, wherein the display unit displays the overcharging state when the sensing unit senses the overcharging state and displays the overdischarging state when the sensing unit senses the overdischarging state.

9. A battery pack protection method, comprising:
   sensing, by a sensing unit, overcharging of a battery when a charging amount is more than a first predetermined reference value and overdischarging of the battery when a discharging amount is more than a second predetermined reference value and the charging amount is less than a third predetermined reference value;
   controlling a plurality of switches so that the battery is only dischargeable during the overcharging or only chargeable during the overdischarging by an output signal of the sensing unit; and
   controlling the plurality of switches so that the battery is both chargeable and dischargeble when the charging amount is less than the first predetermined reference value and more than the third predetermined reference value, and when the discharging amount is more than the second predetermined reference value, during charging or discharging of the battery.

10. The method of claim 9, wherein in the controlling of the plurality of switches so that the battery is only dischargeable during the overcharging or only chargeable during the overdischarging by the output signal of the sensing unit, when the overcharging state of the battery is sensed in the sensing, the switches are controlled so that the battery is only dischargeable by opening the first switch of the plurality of switches and closing the second switch of the plurality of switches.

11. The method of claim 10, wherein in the controlling of the plurality of switches so that the battery is only dischargeable during the overcharging or only chargeable during the overdischarging by the output signal of the sensing unit, when the overdischarging state of the battery is sensed in the sensing, the switches are controlled so that the battery is only chargeable by closing the first switch and opening the second switch.

12. The method of claim 9, further comprising:
   displaying the charging state or the discharging state of the battery.

13. The method of claim 12, wherein in the displaying, the overcharging state is displayed when the overcharging state is sensed in the sensing, and the overdischarging state is displayed when the overdischarging state is sensed in the sensing.

* * * * *